US011757917B2

(12) United States Patent
Pallagatti Kotrabasappa et al.

(10) Patent No.: US 11,757,917 B2
(45) Date of Patent: Sep. 12, 2023

(54) NETWORK ATTACK IDENTIFICATION, DEFENSE, AND PREVENTION

(71) Applicant: VMWARE, INC., Palo Alto, CA (US)

(72) Inventors: Santosh Pallagatti Kotrabasappa, Bangalore (IN); Sairam Veeraswamy, Bangalore (IN); Jayneeta Sinha, Pune (IN); Suriyan S., Bangalore (IN)

(73) Assignee: VMware, Inc., Palo Alto, CA (US)

( * ) Notice: Subject to any disclaimer, the term of this patent is extended or adjusted under 35 U.S.C. 154(b) by 267 days.

(21) Appl. No.: 17/078,203

(22) Filed: Oct. 23, 2020

(65) Prior Publication Data

US 2021/0409433 A1 Dec. 30, 2021

(30) Foreign Application Priority Data

Jun. 30, 2020 (IN) .............................. 202041027783

(51) Int. Cl.
*H04L 9/40* (2022.01)
*H04L 41/0604* (2022.01)
*H04L 41/0213* (2022.01)
*G06F 18/243* (2023.01)

(52) U.S. Cl.
CPC .... *H04L 63/1433* (2013.01); *G06F 18/24323* (2023.01); *H04L 41/0213* (2013.01); *H04L 41/0627* (2013.01); *H04L 63/1425* (2013.01); *H04L 63/1466* (2013.01)

(58) Field of Classification Search
CPC ............. H04L 63/1425; H04L 41/0213; H04L 41/0627; H04L 63/1433; H04L 63/1466; G06K 9/6282
See application file for complete search history.

(56) References Cited

U.S. PATENT DOCUMENTS

| | | | |
|---|---|---|---|
| 11,228,603 B1* | 1/2022 | Anand | G06N 20/00 |
| 11,374,955 B2* | 6/2022 | Bisht | H04L 41/145 |
| 2017/0024660 A1* | 1/2017 | Chen | G06F 21/552 |
| 2020/0267167 A1* | 8/2020 | Venkataswami | H04L 63/1425 |
| 2021/0112091 A1* | 4/2021 | Compton | H04L 63/1416 |
| 2021/0194903 A1* | 6/2021 | Medvedovsky | H04L 63/1433 |
| 2021/0359978 A1* | 11/2021 | Galbreath | H04L 63/1416 |
| 2022/0014560 A1* | 1/2022 | Crabtree | H04L 63/1433 |
| 2022/0021694 A1* | 1/2022 | Higgins | H04L 43/0876 |
| 2022/0046035 A1* | 2/2022 | Rodniansky | H04L 63/1416 |

(Continued)

*Primary Examiner* — Stephen T Gundry
(74) *Attorney, Agent, or Firm* — Dinsmore & Shohl LLP (57) ABSTRACT

The disclosure provides an approach for detecting and preventing attacks in a network. Embodiments include receiving network traffic statistics of a system. Embodiments include determining a set of features of the system based on the network traffic statistics. Embodiments include inputting the set of features to a classification model that has been trained using historical features associated with labels indicating whether the historical features correspond to attacks. Embodiments include receiving, as output from the classification model, an indication of whether the system is a target of an attack. Embodiments include receiving additional statistics related to the system. Embodiments include analyzing, in response to the indication that the system is the target of the attack, the additional statistics to identify a source of the attack. Embodiments include performing an action to prevent the attack based on the source of the attack.

17 Claims, 5 Drawing Sheets

(56) References Cited

U.S. PATENT DOCUMENTS

| | | | |
|---|---|---|---|
| 2022/0053013 A1* | 2/2022 | Crabtree | H04L 63/1416 |
| 2022/0060497 A1* | 2/2022 | Crabtree | H04L 41/22 |
| 2022/0060507 A1* | 2/2022 | Crabtree | H04L 63/1433 |
| 2022/0086064 A1* | 3/2022 | Sivaraman | G06F 18/2135 |
| 2022/0095092 A1* | 3/2022 | Siddam | H04L 63/102 |
| 2022/0116421 A1* | 4/2022 | Yadav | H04L 63/1491 |
| 2022/0116427 A1* | 4/2022 | Kwan | H04L 12/413 |
| 2022/0141194 A1* | 5/2022 | Xiao | H04L 63/029 |
| | | | 726/12 |
| 2022/0141253 A1* | 5/2022 | Xiao | H04L 63/0281 |
| | | | 726/22 |
| 2022/0166673 A1* | 5/2022 | Kompella | H04L 41/122 |
| 2022/0217121 A1* | 7/2022 | Devarajan | H04L 41/0681 |
| 2022/0224723 A1* | 7/2022 | Crabtree | G06F 16/951 |

* cited by examiner

NETWORK ATTACK IDENTIFICATION, DEFENSE, AND PREVENTION

RELATED APPLICATIONS

Benefit is claimed under 35 U.S.C. 119(a)-(d) to Foreign Application Serial No. 202041027783 filed in India entitled "NETWORK ATTACK IDENTIFICATION, DEFENSE, AND PREVENTION", on Jun. 30, 2020, by VMware, Inc., which is herein incorporated in its entirety by reference for all purposes.

BACKGROUND

Software defined networking (SDN) comprises a plurality of hosts in communication over a physical network infrastructure, each host having one or more virtualized endpoints such as virtual machines (VMs), containers, or other virtual computing instances (VCIs) that are connected to logical overlay networks that may span multiple hosts and are decoupled from the underlying physical network infrastructure. Though certain aspects are discussed herein with respect to VMs, it should be noted that they may similarly be applicable to other suitable VCIs.

For example, any arbitrary set of VMs in a datacenter may be placed in communication across a logical Layer 2 network by connecting them to a logical switch. Each logical switch corresponds to a virtual network identifier (VNI), meaning each logical Layer 2 network can be identified by a VNI. The logical switch is collectively implemented by at least one virtual switch on each host that has a VM connected to the logical switch. The virtual switch on each host operates as a managed edge switch implemented in software by the hypervisor on each host. Forwarding tables at the virtual switches instruct the host to encapsulate packets, using a virtual tunnel endpoint (VTEP) for communication from a participating VM to another VM on the logical network but on a different (destination) host. The original packet from the VM is encapsulated at the VTEP with an outer IP header addressed to the destination host using a mapping of VM IP addresses to host IP addresses. At the destination host, a second VTEP decapsulates the packet and then directs the packet to the destination VM. Logical routers extend the logical network across subnets or other network boundaries using IP routing in the logical domain. The logical router is collectively implemented by at least one virtual router on each host or a subset of hosts. Each virtual router operates as a router implemented in software by the hypervisor on the hosts.

SDN generally involves the use of a management plane (MP) and a control plane (CP). The management plane is concerned with receiving network configuration input from an administrator or orchestration automation and generating desired state data that specifies how the logical network should be implemented in the physical infrastructure. The management plane may have access to a database application for storing the network configuration input. The control plane is concerned with determining the logical overlay network topology and maintaining information about network entities such as logical switches, logical routers, endpoints, etc. The logical topology information specifying the desired state of the network is translated by the control plane into network configuration data that is then communicated to network elements of each host. The network configuration data, for example, includes forwarding table entries to populate forwarding tables at virtual switch(es) provided by the hypervisor (i.e., virtualization software) deployed on each host. An example control plane logical network controller is described in U.S. Pat. No. 9,525,647 entitled "Network Control Apparatus and Method for Creating and Modifying Logical Switching Elements," which is fully incorporated herein by reference.

The rapid growth of network virtualization has led to an increase in large scale SDN data centers. The scale of such data centers may be very large, often including hundreds of servers with each server hosting hundreds of VCIs. With such scale comes a need to be able to operate such topologies efficiently and securely.

A malicious attack (e.g., such as performed by malware) on a physical computing system or VM often attacks the application level (e.g., by spreading through the operating environment, introducing new processes, manipulating processes to communicate with new insecure devices, etc.). A security manager (e.g., AppDefense™ from VMware, Inc. in Palo Alto, Calif.) aims to protect against malicious attacks in data centers. The security manager is a data center endpoint security system that protects applications running on clients (e.g., VMs) in (e.g., logical) networks. For example, the security manager may allow or disallow connections (e.g., a connection between endpoints and corresponding to a source IP address, source port, destination IP address, and destination port), generate warnings or notifications, or perform other actions when a security threat is detected. In some cases, the security manager may determine baseline behavior of a VM by learning the VM's process and network activity during an observation or learning period. After the baseline behavior is determined, it is treated as a policy for the VM, on the basis of which various remediation actions (e.g., allow/disallow, alarm, and the like) occur. In addition to the learned behavior, user-defined policies can also be applied. In some embodiments, a security manager enforces policies defined in a management plane and/or by an administrator.

One of the most prevalent network attacks that threatens enterprise and industry grade networks is a denial-of-service (DoS) flooding attack. A DoS attack causes a machine or network resource to be unavailable to its intended users by temporarily or indefinitely disrupting services of a host connected to a network.

Conventionally, DoS attack detection is performed based on per-connection statistics in the data plane, and prevention measures are taken when per-connection statistics show unexpected behavior or values exceeding allowed thresholds. However, these techniques may lead to false negatives in some cases. Furthermore, maintaining and analyzing per-connection statistics is a burden on data plane resources, which are already constrained through normal activity.

As such, there is a need in the art for improved techniques of detecting and preventing security threats in data centers.

SUMMARY

Embodiments provide a method of detecting and preventing attacks in a network. Embodiments include; receiving network traffic statistics of a system; determining a set of features of the system based on the network traffic statistics; inputting the set of features to a classification model that has been trained using historical features associated with labels indicating whether the historical features correspond to attacks; receiving, as output from the classification model, an indication of whether the system is a target of an attack; receiving additional statistics related to the system; analyzing, in response to the indication that the system is the target of the attack, the additional statistics to identify a source of the attack; and performing an action to prevent the attack based on the source of the attack.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for identifying and preventing security threats in data centers. In particular, techniques described herein involve separate stages for detecting targets of attacks and detecting sources of attacks, where data of different types and different levels of granularity is efficiently utilized as needed at different stages to avoid overburdening system resources.

In order to detect whether a system, such as a virtual machine (VM), in a data center may be the target of an attack, such as a denial-of-service (DoS) attack, a classification model is trained to output an indication of whether a given system is the target of an attack based on statistics related to the system that are input to the classification model. As explained in more detail below, the classification model may be trained using historical system statistics from when attacks did or did not take place. Statistics used for target identification may be, for example, network traffic statistics, such as simple network management protocol (SNMP) statistics.

Once a system is identified as a potential target of an attack based on output from the classification model, additional statistics of the system are gathered in order to determine a source of the attack. For example, security statistics of the system may be received from a security component, and may indicate whether any alarms have been raised for the system, as well as information about connections to and from the system. In some embodiments, application-level statistics may be received for the system, including data at a finer granularity than that used for target identification (e.g., relating to individual applications on the system rather than to the system at a higher level). Furthermore, resource utilization statistics for the system may be received. These additional statistics are analyzed using a source identification algorithm, as described in more detail below, in order to determine a likely source of the attack.

Once a target and a source of an attack are identified, action may be taken to prevent the attack. For example, firewalls mat be established, systems may be removed from the network, administrators may be notified, and/or the like.

As such, embodiments of the present disclosure allow security threats to be efficiently and accurately identified and prevented in data centers without excessively burdening data center resources.

Figure 1:
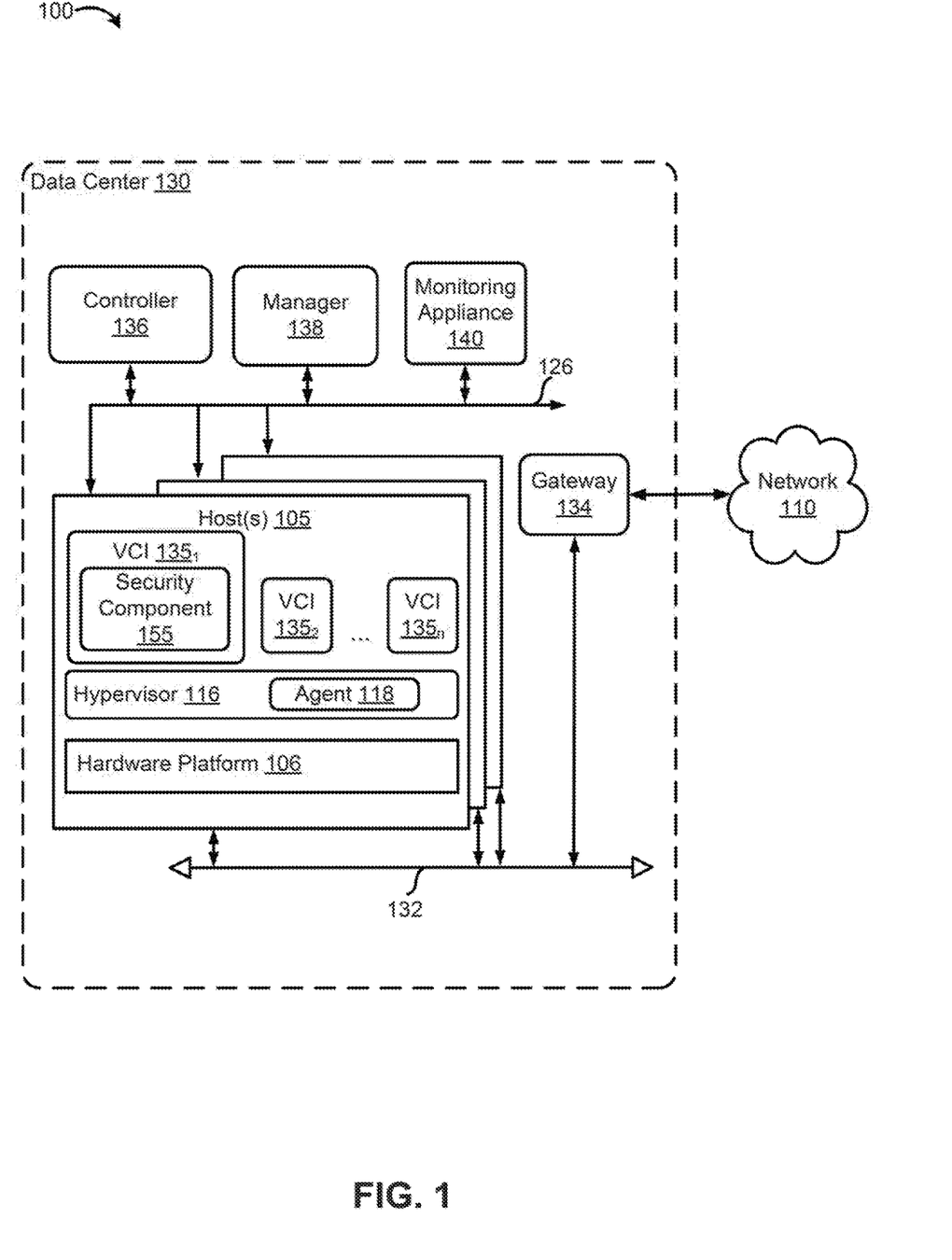
FIG. 1 depicts example physical and virtual network components with which embodiments of the present disclosure may be implemented.

FIG. 1 depicts example physical and virtual network components with which embodiments of the present disclosure may be implemented.

Networking environment 100 includes data center 130 connected to network 110. Network 110 is generally representative of a network of computing entities such as a local area network ("LAN") or a wide area network ("WAN"), a network of networks, such as the Internet, or any connection over which data may be transmitted.

Data center 130 generally represents a set of networked computing entities, and may comprise a logical overlay network. Data center 130 includes host(s) 105, a gateway 134, a data network 132, which may be a Layer 3 network, and a management network 126. Data network 132 and management network 126 may be separate physical networks or different virtual local area networks (VLANs) on the same physical network.

Each of hosts 105 may be constructed on a server grade hardware platform 106, such as an x86 architecture platform. For example, hosts 105 may be geographically co-located servers on the same rack or on different racks. Host 105 is configured to provide a virtualization layer, also referred to as a hypervisor 116, that abstracts processor, memory, storage, and networking resources of hardware platform 106 into multiple virtual computing instances (VCIs) $135_1$ to $135_n$ (collectively referred to as VCIs 135 and individually referred to as VCI 135) that run concurrently on the same host. VCIs 135 may include, for instance, VMs, containers, virtual appliances, and/or the like.

Hypervisor 116 may run in conjunction with an operating system (not shown) in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In certain aspects, hypervisor 116 implements one or more logical entities, such as logical switches, routers, etc. as one or more virtual entities such as virtual switches, routers, etc. In some implementations, hypervisor 116 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine. Although aspects of the disclosure are described with reference to VMs, the teachings herein also apply to other types of virtual computing instances (VCIs) or data compute nodes (DCNs), such as containers, which may be referred to as Docker containers, isolated user space instances, namespace containers, etc. In certain embodiments, VCIs 135 may be replaced with containers that run on host 105 without the use of a hypervisor.

Gateway 134 provides VCIs 135 and other components in data center 130 with connectivity to network 110, and is used to communicate with destinations external to data center 130 (not shown). Gateway 134 may be a virtual computing instance, a physical device, or a software module running within host 105.

Controller 136 generally represents a control plane that manages configuration of VCIs 135 within data center 130. Controller 136 may be a computer program that resides and executes in a central server in data center 130 or, alternatively, controller 136 may run as a virtual appliance (e.g., a VM) in one of hosts 105. Although shown as a single unit, it should be understood that controller 136 may be implemented as a distributed or clustered system. That is, controller 136 may include multiple servers or virtual computing instances that implement controller functions. Controller 136 is associated with one or more virtual and/or physical CPUs (not shown). Processor(s) resources allotted or assigned to controller 136 may be unique to controller 136, or may be shared with other components of data center 130. Controller 136 communicates with hosts 105 via management network 126.

Manager 138 represents a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints. In one embodiment, manager 138 is a computer program that executes in a central server in networking environment 100, or alternatively, manager 138 may run in a VM, e.g. in one of hosts 105. Manager 138 is configured to receive inputs from an administrator or other entity, e.g., via a web interface or API, and carry out administrative tasks for data center 130, including centralized network management and providing an aggregated system view for a user.

Monitoring appliance 140 generally represents a component of data center 130 that monitors statistics of VCIs on hosts 105 and detects and prevents security threats according to embodiments of the present disclosure, as described in more detail below with respect to FIG. 2. In one embodiment, monitoring appliance 140 is a computer program that executes in a central server in networking environment 100, or alternatively, monitoring appliance 140 may run in one or more VMs, e.g. in one or more of hosts 105. In one embodiment, monitoring appliance 140 is implemented in a distributed fashion across a plurality of VCIs on a plurality of hosts 105.

In some embodiments, monitoring appliance 140 communicates with an agent on each of hosts 105, such as agent 118 in hypervisor 116, in order to retrieve statistics of VCIs, such as VCIs 135. In some embodiments, statistics are retrieved by hypervisor 116 from endpoint monitoring components (not shown) running on every VCI and/or from network flow data, such as through a virtual switch, monitored by hypervisor 116 on each host 105. Statistics may include, for example, network ports (e.g., coupled to a virtual switch) on which a VCI listens for traffic, network ports on which a VCI connects to remote processes, processes running on a VCI, remote processes to which a VCI connects, numbers of connections to a process or port from a VCI, numbers of processes running on a VCI, command line parameters of a VCI, and/or the like In some embodiments, the statistics include SNMP statistics, which monitoring appliance 140 uses for target identification as described in more detail below with respect to FIG. 3. For example, management information base (MIB) variables of SNMP statistics may be collected from SNMP agents on each system and used as inputs to a classification model. For example, SNMP statistics may be collected from an SNMP agent in each VCI (e.g., which may be part of a security component 155). In some embodiments, agent 118 of the host is a security host agent that communicates with monitoring appliance 140. For instance, agent 118 may collect VCI data from security component 155 and send the VCI data to monitoring appliance 140.

In some embodiments, security statistics are retrieved by hypervisor 116 from a security component 155 on each VCI 135 using an agent 118 on each host 105. The security statistics may include, for example, alarms raised, allowed connections, provisioning events, allowed behaviors, and/or the like. Hypervisor 116 may also retrieve application-level statistics from each VCI, such as all network activity of individual processes. Furthermore, hypervisor 116 may retrieve resource utilization statistics from each VCI, such as processor and memory utilization data for each process. The security statistics, application-level statistics, and resource utilization statistics may be used by monitoring appliance 140 for source identification as described in more detail below with respect to FIG. 4.

In some embodiments, monitoring appliance 140 communicates with VCIs 135 via agent 118 and/or with manager 138 in order to prevent detected security threats. For example, firewalls may be used to block traffic from entities identified as sources of attacks, targets and/or sources of attacks may be disconnected from data center 130, security component 155 may be used to protect VCIs from attacks, an administrator may be notified of attacks, and/or the like.

Figure 2:
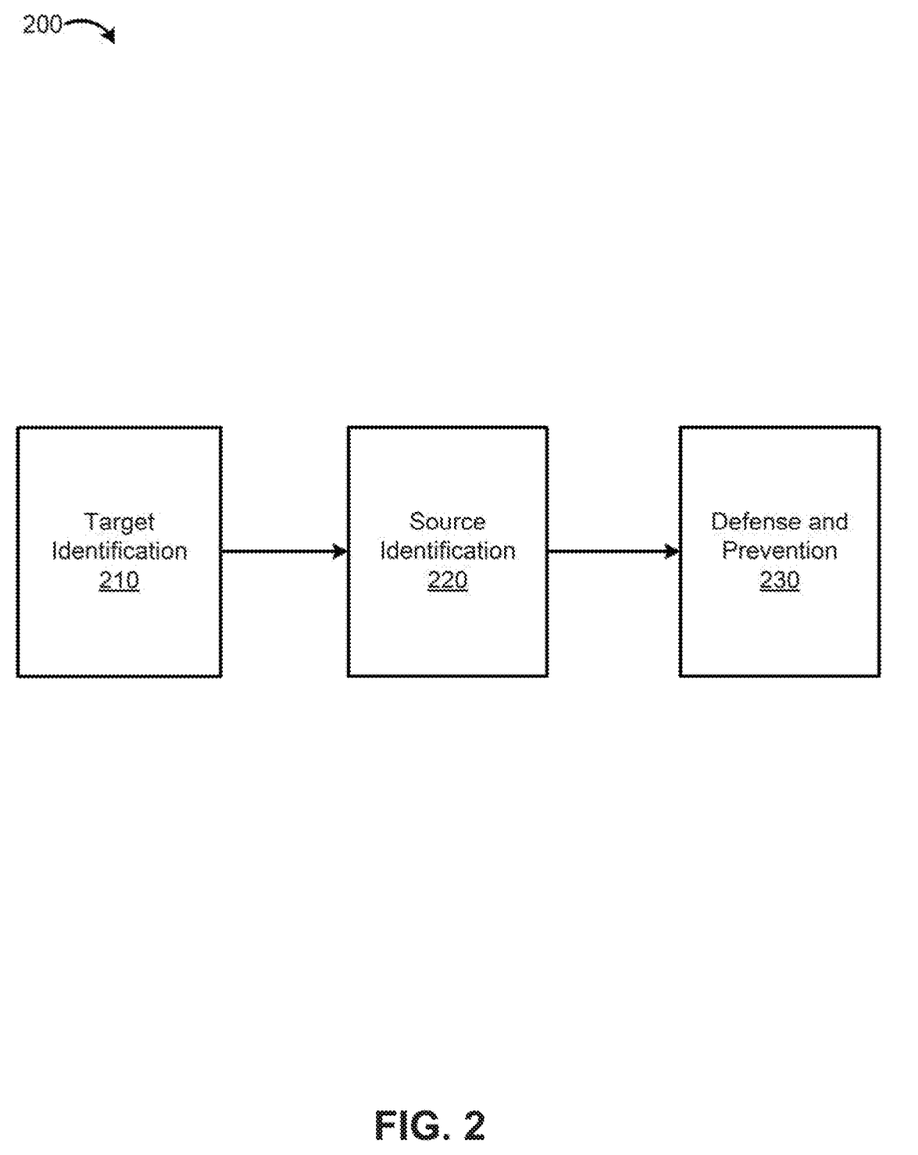
FIG. 2 depicts an example of operations related to identifying and preventing security threats according to embodiments of the present disclosure.

FIG. 2 depicts an example of operations 200 related to identifying and preventing security threats according to embodiments of the present disclosure. In some embodiments, aspects of operations 200 are performed by monitoring appliance 140 of FIG. 1.

Target identification 210 involves determining whether a system (e.g., a VCI 135 of FIG. 1) may be a target of an attack. As described in more detail below with respect to FIG. 3, target identification 210 involves using a trained classification model to determine whether a given system is a target based on network traffic statistics of the system.

Once a system is identified as a target of an attack during target identification 210, source identification 220 is performed in order to determine a source of the attack. As described in more detail below with respect to FIG. 4, source identification 220 involves analyzing additional statistics related to a system identified as a target, such as security statistics, application-level statistics, and resource utilization statistics. A source may be identified within data center 130 of FIG. 1 or outside of the data center.

When a source of the attack is identified, defense and prevention 230 is performed in order to protect against the attack. For example, firewalls may be configured to block traffic from the source, the target and/or source may be disconnected from the network, notifications of the attack may be provided to one or more components, and/or the like. In an example, micro-segmentation is used to prevent an attack that is internal to the data center. In another example, a perimeter firewall is used to prevent an attack that is external to the data center. In some embodiments, certain aspects of defense and prevention 230 may be performed prior to source identification 220. For example, as soon as a system is identified as a target during target identification 210, the system may potentially be disconnected from the network in order to protect the system and/or other endpoints in the network until the source of the attack is identified and additional prevention measures are enacted.

Some aspects of defense and prevention 230 may be performed by security component 155 of FIG. 1.

Figure 3:
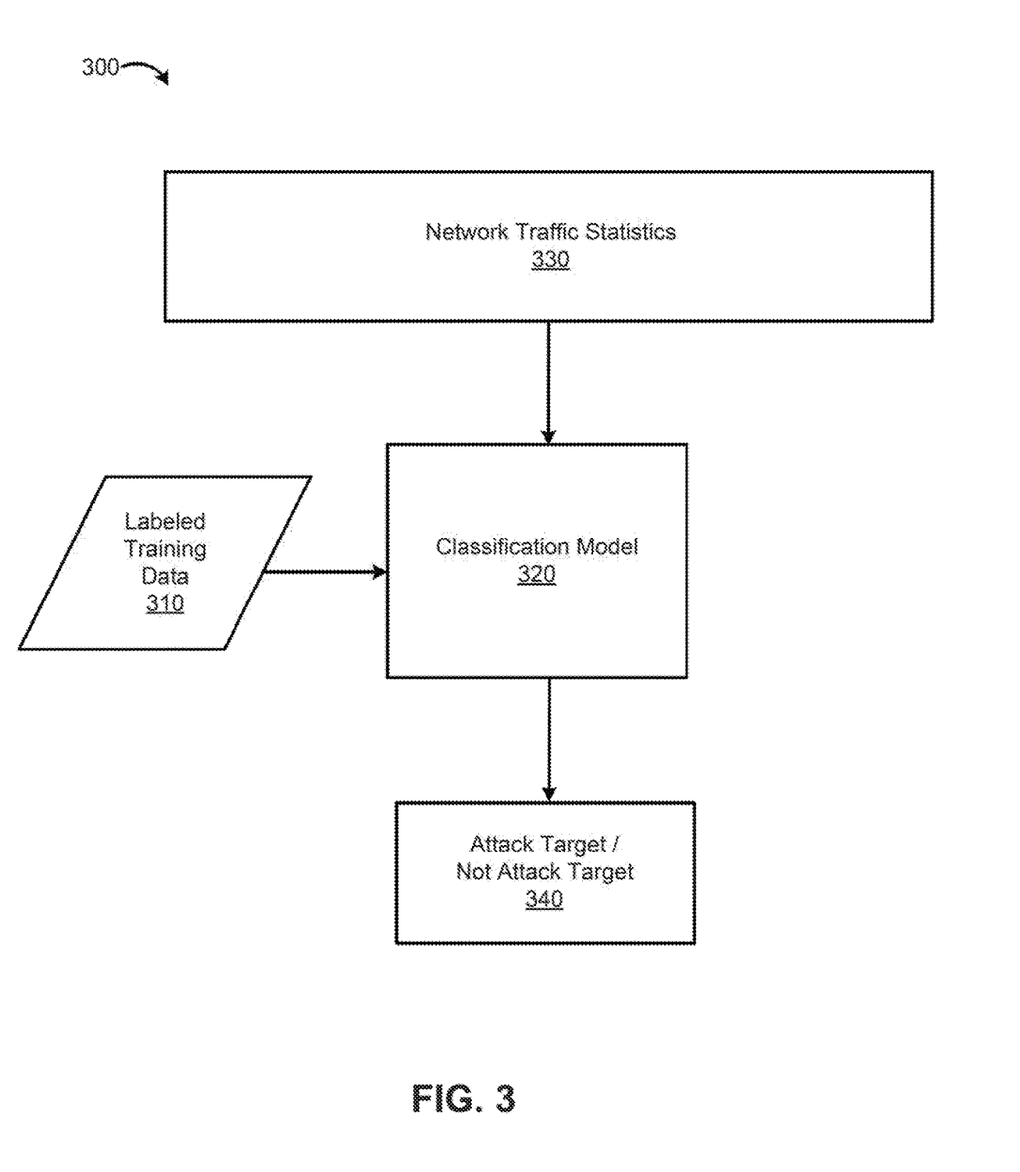
FIG. 3 depicts an example of target identification for identifying and preventing security threats according to embodiments of the present disclosure.

FIG. 3 depicts an example of target identification 300 for identifying and preventing security threats according to embodiments of the present disclosure. In some embodiments, target identification 300 corresponds to target identification 210 of FIG. 2 and is performed by monitoring appliance 140 of FIG. 1.

In target identification 300, a classification model 320 is trained using labeled training data 310. In certain embodiments, classification model 320 is a tree-based classifier, such as a random forest classifier. A tree-based classifier makes a classification by dividing inputs into smaller classifications at nodes, which result in an ultimate classification at a leaf. A random forest extends the concept of a tree-based classifier, except the nodes included in any given decision tree within the forest are selected with some randomness, thereby reducing bias and group outcomes based upon the responses most likely to be positive. In some embodiments, a random forest classifier includes a number of independent decision trees, each decision tree being trained with different sets of sampled data from the dataset. The output of a decision tree does not depend on the output of another tree, but the final output class of the model depends on the output from each tree, such as a class that is predicted by the highest number of trees. A random forest classifier is included as an example, and other types of machine learning models may alternatively be used to perform techniques described herein. Classification model 320 is trained using machine learning techniques.

Machine learning techniques generally involve using a set of training inputs and training outputs to build a model that will output a value in response to inputs. Inputs may be described as "features". For example, each training data instance may include training data inputs or features (e.g., certain network traffic statistics related to a particular system) associated with a training data output or label (e.g., an indication of whether or not the system was the target of an attack when the statistics were collected). A plurality of training data instances is used to train the model, such as by constructing a model that represents relationships between features and output values. In some embodiments, training involves providing training data inputs to the model and iteratively adjusting parameters of the model until the outputs from the model in response to the training data inputs match (or fall within a certain range of) the training data outputs associated with the training data inputs, or until a certain number of iterations have been completed without significant improvements in accuracy.

Training data may, for example, be generated based on historical statistics of systems corresponding to instances when an attack did or did not occur. For instance, an administrator may label a set of statistics of a system to indicate that the system was the target of an attack when the statistics were collected, and may label another set of statistics of a system to indicate that the system was not the target of an attack when the statistics were collected. In some embodiments, an attack may be intentionally performed or simulated on a target (e.g., in a closed or controlled environment) in order to collect statistics of the target for generation of training data.

The statistics used as features for training the model may be a subset of all network traffic statistics collected. In some embodiments, a feature selection algorithm is used to select features most likely to be indicative of whether or not a system is a target of an attack. For example, a plurality of models may be trained with different subsets of statistics (e.g., randomly selected), and the plurality of models may be tested using testing data (e.g., sets of statistics with known labels) in order to determine which model is most accurate. The subset of the statistics used to train the most accurate model may be used as input features for training classification model 320. In one embodiment, MIB objects related to interface, UDP, and IP categories from SNMP statistics are used as input features.

The trained model may be subjected to testing. Testing generally involves taking a datapoint from a test dataset as input, performing classifications by all decision trees in the model (each decision tree will predict a class), performing voting to determine the class that is predicted by the highest number of decision trees, and verifying that the finally predicted class matches test labels.

In some embodiments, two separate classifiers are used. For example, a first classifier may be a binary classifier that outputs either that a given system is the target of an attack or not the target of an attack. A second classifier may be a multi-class classifier that outputs the type of the attack. If the first classifier classifies the traffic as attack traffic, the second classifier is used to identify the type of the attack. The second classifier may be trained and tested in a similar manner to the first classifier, using historical statistics labeled with a type of attack that was associated with the statistics.

Once trained and tested, classification model 320 is used to determine whether systems are targets of attacks. Network traffic statistics 330 of each system (e.g., each VCI 135 of FIG. 1) are provided as inputs to classification model 310, and classification model 320 outputs labels 340 indicating whether each system is an attack target or is not an attack target. In some embodiments, a second classifier is also used to determine a type of an attack (e.g., DoS, brute force attack, hypertext transfer protocol (HTTP) flood, user datagram protocol (UDP) flood, or the like).

If a system is identified as a target based on a label 340 output by classification model 320, then a source identification process may be performed as described below with respect to FIG. 4. In some embodiments, the system identified as a target is disconnected from the network, at least temporarily, while the source identification is performed in order to protect the system and other endpoints in the network.

In one example implementation of the classification model for target identification, the data collection phase involves collecting MIB variables from an SNMP agent on a target system. In one example, 34 MIB variables across 5 MIB groups (Interface, transport control protocol (TCP), IP, UDP, internet control message protocol (ICMP)) are collected using their object Identifiers (OIDs). In the data analysis phase, a random forest feature extraction technique is applied on the 34 variables. In one example, the feature extraction technique reduces the number of MIB variables to 19. These 19 MIB variables may be the input features for the random forest classifier. The entire dataset may be split, such as with 80% used for training and 20% used for testing. The model construction may involve building two random forest classifiers. The first classifier may be a binary classifier to classify if the type of the traffic is attack or normal. In the event that traffic is classified as attack, the second classifier may be used to classify the type of the attack. Both of the random forest classifiers may be built with the number of trees as 100. Finally, the built models may be tested using the testing data from the dataset as well as online data collected from an SNMP agent. The results of this example implementation may show that the MIB objects under Interface, UDP, and IP groups are highly correlated to the attacks while the other two groups (TCP and ICMP) are not completely correlated to the attacks.

Figure 4:
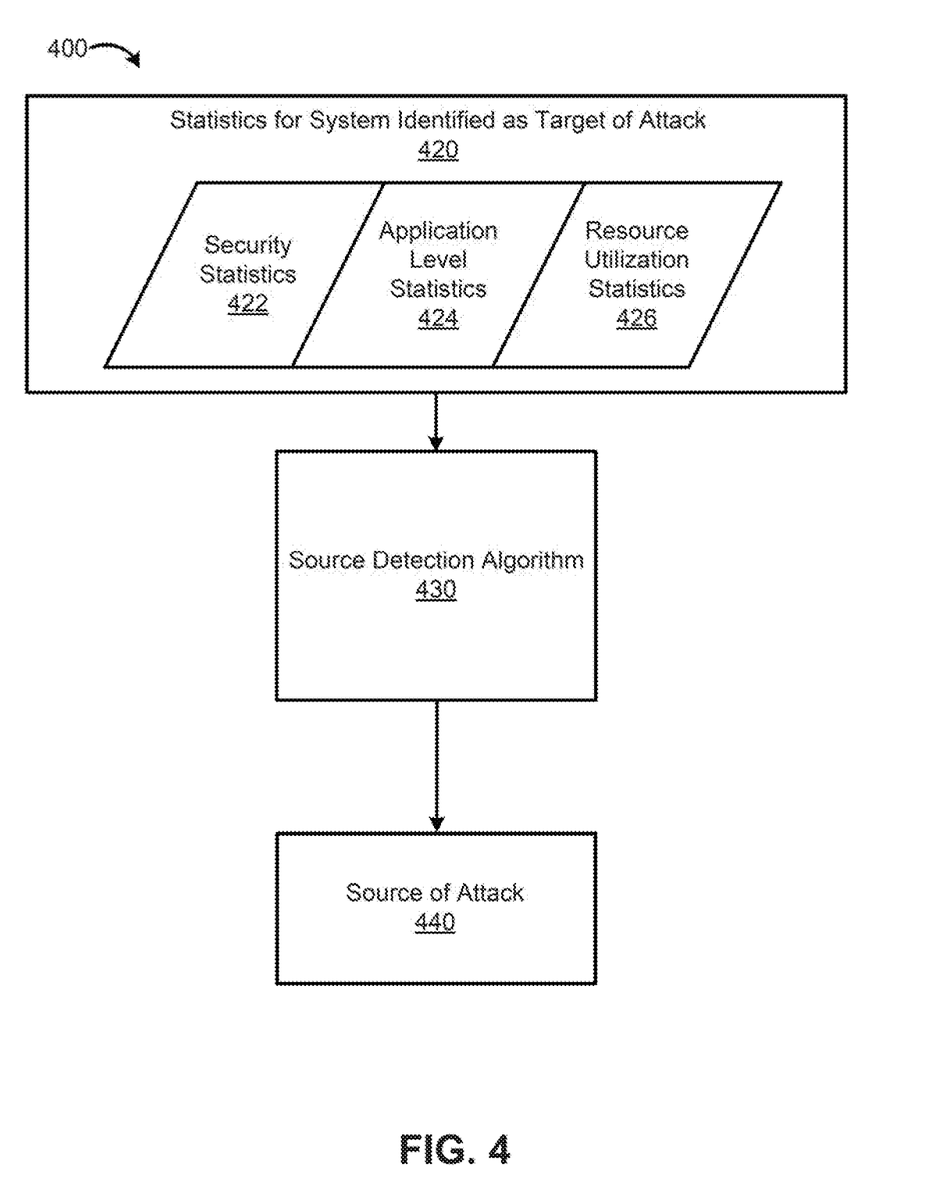
FIG. 4 depicts an example of source identification for identifying and preventing security threats according to embodiments of the present disclosure.

FIG. 4 depicts an example of source identification 400 for identifying and preventing security threats according to embodiments of the present disclosure. In some embodiments, source identification 400 corresponds to source identification 220 of FIG. 2, and is performed by monitoring appliance 140 of FIG. 1 after a target is identified as described above with respect to FIG. 3.

Statistics 420 for a system identified as a target of an attack are collected from one or more sources. Security statistics 422 may be received from security component 155 of FIG. 1, and may include alerts raised for processes running on the system, allowed connections and other allowed behavior for the system, and/or the like. For example, allowed behavior statistics may include paths and process names of a binary, a hash of a binary, command line arguments, outbound connection information such as local ports from which connections are initiated, remote ports to which connections are made, remote addresses (e.g., internet protocol (IP), domain, IP range) to which connections are made, protocols used, inbound connection information such as local ports to which connections are made and protocols used, times at which behavior was last seen, numbers of times behaviors were seen, and/or the like.

Application-level statistics 424 include data about specific processes running on the system. For example, application-level statistics 424 may include network traffic statistics for individual processes, resource utilization for individual processes, numbers of connections for individual processes, and/or the like. It is noted that application-level statistics 424 may overlap with other types of statistics, but are at the level of individual processes rather than at a higher system level.

Resource utilization statistics 426 generally include information about processor and memory utilization, network I/O, numbers of connections, and/or the like. In some embodiments, resource utilization statistics 426 include information about resources utilized by individual processes and, as such, may overlap with application-level statistics 424. Furthermore, statistics 420 may also include at least a subset of network traffic statistics 330 of FIG. 3 that were used during target identification.

Statistics 420 are then used in a source detection algorithm 430 to determine a source 440 of the attack. Source detection algorithm 430 may also utilize a time frame associated with the statistics from which an attack target was identified to identify a source of the attack. For example, source detection algorithm 430 may focus on statistics 420 collected during the time frame associated with when the attack was identified (e.g., within a certain threshold time before and after a time associated with network traffic statistics for which an attack target was identified) when identifying the source.

In some embodiments, source detection algorithm 430 proceeds according to a series of steps. First, source detection algorithm 430 determines whether any alarms are indicated for the system in statistics 420. An alarm is generally raised by a security component, such as security component 155 of FIG. 1, when an application deviates from allowed behavior. For example, security component 155 may have a rule indicating that an application is only allowed to utilize a given amount of processing resources, and may raise an alarm if the application exceeds the given amount of processing resources. If statistics 420 indicate that an alarm has been raised, source detection algorithm 430 determines whether the alarm is raised for a connection. If an alarm is raised for a connection, source detection algorithm 430 evaluates resource utilization statistics for the connection. Source detection algorithm 430 may also evaluate resource utilization statistics for any processes using the connection. If an anomaly is identified in the resource utilization data for the connection and/or processes using the connection, then source detection algorithm 430 may identify a source of the connection (e.g., source IP address) as the source 440 of the attack. An anomaly may be detected, for example, if resource utilization deviates from an expected range (e.g., if CPU, memory, or network I/O utilization for a connection or process exceeds an upper threshold or drops below a lower threshold that has been defined as an expected range, such as based on historical resource utilization and/or ranges defined by an administrator or other user).

If no alarms are raised, or if no alarms are raised for connections, then source detection algorithm 430 determines if any new connections have been established. For any new connections, source detection algorithm 430 evaluates the resource utilization statistics for new connections and/or the processes using the new connections. If an anomaly is determined in the resource utilization statistics for a new connection, then the source address of the new connection may be identified as the source 440 of the attack.

If no alarms are raised for connections and no new connections have been established, then source detection algorithm 430 evaluates resource utilization statistics for all connections as well as for processes using all connections. If an anomaly is found for a connection, then source detection algorithm 430 may identify a source address of the connection as the source 440 of the attack.

In some embodiments, in order to avoid false positives through a cross-checking process, source detection algorithm 430 only identifies a source address of a connection as the source 440 of the attack if an anomaly is identified in resource utilization statistics for both the connection and processes using the connection.

Once a source 440 of an attack is identified, action may be taken to defend against the attack. For example, a firewall may be configured to block traffic from the source. In some embodiments, a firewall is configured by sending a notification to the control plane, which configures the firewall (e.g., coupled to a virtual switch) on the host system, to block traffic (e.g., with a firewall rule that blocks traffic from the source address). In alternative embodiments, traffic from the source may be blocked on each VCI in the data center directly. If the target system was temporarily disconnected from the network prior to source identification, the target system may be reconnected once action has been taken to block the attack. In some embodiments, if the source is a system or process within the network, the system or process may be disconnected from the network. In some embodiments, monitoring appliance 140 of FIG. 1 communicates with security component 155 on individual VCIs 135 of FIG. 1 to indicate the source of the attack so that security component 155 may take action to protect against the attack, such as by blacklisting the source of the attack. Notifications of the target and/or source of the attack may also be provided to other components in the data center, such as manager 138 of FIG. 1.

In certain embodiments, feedback may be received in response to a notification sent to manager 138. For example, an administrator may confirm whether or not an attack actually occurred, and this feedback may be used to re-train classification model 320 of FIG. 3. For example, a new training data instance may be generated including the statistics of the system that were used as inputs to classification model 320 of FIG. 3 and a label indicating whether or not the system was a target of an attack based on the feedback, and the training data instance may be used to re-train the model.

Figure 5:
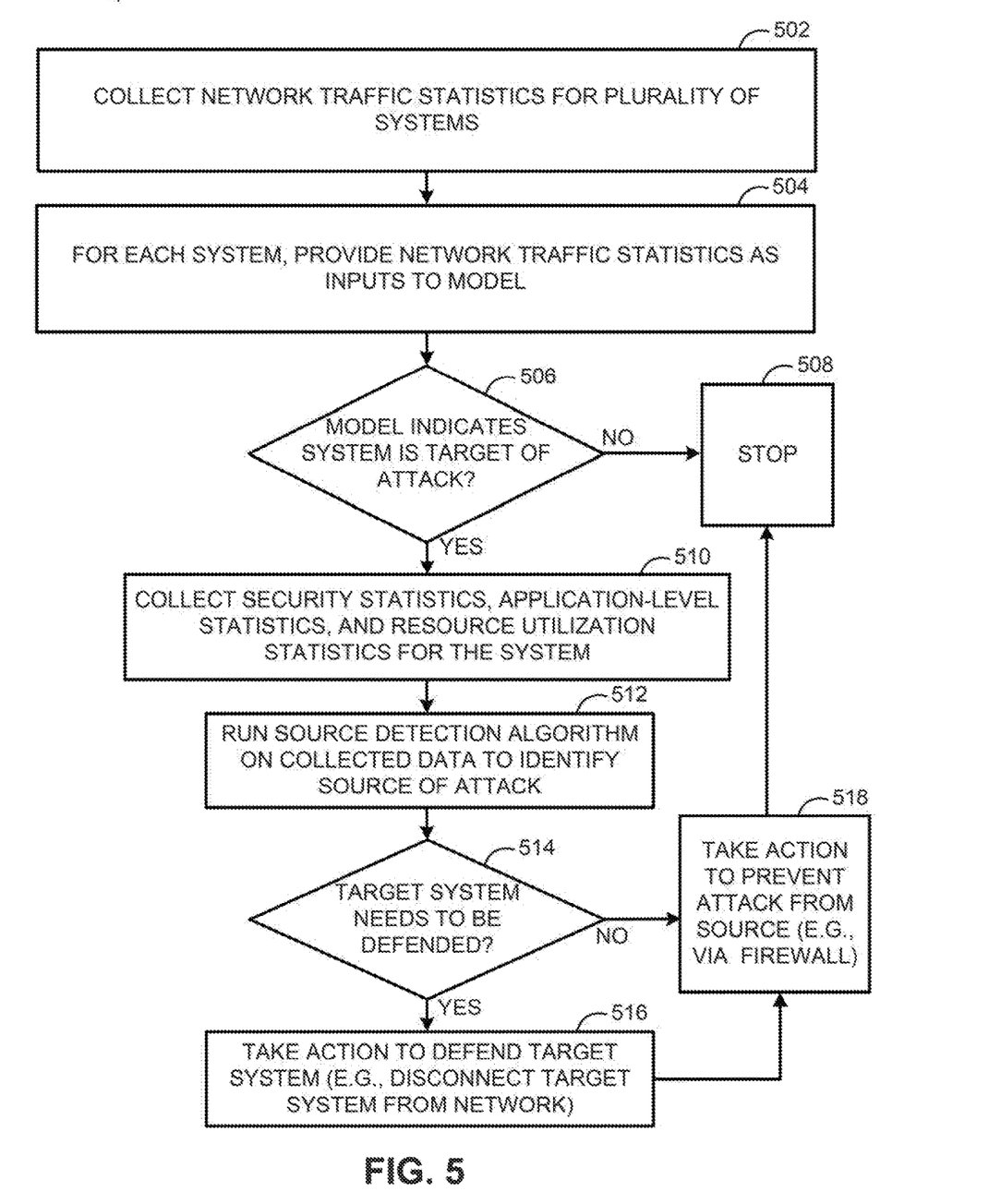
FIG. 5 depicts an example flow chart for identifying and preventing security threats according to embodiments of the present disclosure.

FIG. 5 depicts an example flowchart 500 for identifying and preventing security threats according to embodiments of the present disclosure. For example, flowchart 500 may represent operations performed by monitoring appliance 140 of FIG. 1.

At step 502, network traffic statistics are collected for a plurality of systems. For example, SNMP statistics may be collected for each VCI 135 of FIG. 1 in data center 130 of FIG. 1.

At step 504, for each system, network traffic statistics are provided as inputs to a model. For example, a subset of the network traffic statistics for a given system may be provided as input features to trained classification model 330 of FIG. 3. The inputs may have been selected using a feature selection algorithm as described above.

At step 506, it is determined whether the model indicates that a given system is a target of an attack. If the model does not indicate that the given system is the target of the attack, then operations stop at 508 for the given system. If the model indicates that the given system if a target of an attack, then operations continue at step 510, where security statistics, application-level statistics, and resource utilization statistics for the given system are collected.

At step 512, a source detection algorithm is run on the data collected at step 510 in order to identify a source of the attack. For example, source detection algorithm 430 of FIG. 4 may be run, and may include determining whether any alarms are raised, whether any new connections have been established, whether resource utilization data indicates any anomalies for any connections and/or processes, and/or the like In some embodiments, a source address of a connection for which an alarm and/or anomaly is determined is identified as the source of the attack.

At step 514, it is determined whether the target system needs to be defended. For example, if the attack is ongoing and/or if the target system is particularly vulnerable due to storing sensitive data or the like, then action may need to be taken to defend the target system. If the target system needs to be defended, operations continue to step 516, where action is taken to defend the target system, such as by disconnecting the target system from the network. In alternative embodiments, the target system is disconnected from the network prior to source identification.

If the target system does not need to be defended or, otherwise, after action has been taken to defend the target system, operations continue with step 518, where action is taken to prevent the attack from the source. For example, a firewall may be configured to block traffic from the source. In another example, a security component may be notified of the source of the attack, and the security component may blacklist traffic from the source. Furthermore, notifications may be sent indicating the target and/or source of the attack, such as to a management entity. Operations then proceed to 508, where no further action is taken for the given system.

It is noted that while certain embodiments of the present disclosure are described with respect to virtual components (e.g., VCIs), techniques described herein may also be implemented with physical components. For example, target identification, source identification, and defense and prevention of attacks as described herein may be performed for physical computing systems.

The various embodiments described herein may employ various computer implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and/or the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of detecting and preventing attacks in a network, comprising:
  receiving network traffic statistics of a system; determining a set of features of the system based on the network traffic statistics;
  inputting the set of features to a classification model that has been trained using historical features associated with labels indicating whether the historical features correspond to attacks;
  receiving, as output from the classification model, an indication that the system is a target of an attack;
  in response to receiving the indication that the system is the target of the attack, receiving additional statistics related to the system;
  analyzing, the additional statistics to identify a source of the attack; and
  performing an action to prevent the attack based on the source of the attack;
  wherein determining the set of features of the system based on the network traffic statistics comprises selecting a subset of the network traffic statistics to provide as inputs to the classification model based on an input selection algorithm.

2. The method of claim 1, wherein the network traffic statistics comprise simple network management protocol (SNMP) statistics.

3. The method of claim 1, wherein the additional statistics comprise one or more of:
  security data;
  application-level statistics; or
  resource utilization information.

4. The method of claim 1, wherein analyzing the additional statistics to identify the source of the attack comprises one or more of:
  determining whether the additional statistics indicate any alarms related to the system that indicate deviation from allowed behavior for any connections or processes of the system;
  determining whether the additional statistics indicate any new connections related to the system; or
  determining whether the additional statistics indicate any anomalies related to the system, wherein an anomaly comprises a deviation from an expected range for a given statistic.

5. The method of claim 4, wherein analyzing the additional statistics to identify the source of the attack further comprises determining a source address of a connection for which an anomaly is determined based on the additional statistics.

6. The method of claim 1, wherein the classification model comprises a random forest classifier.

7. The method of claim 1, wherein performing the action to prevent the attack based on the source of the attack comprises one or more of:
  applying a firewall;
  removing the system from the network;
  removing the source of the attack from the network;
  notifying a security component of the source of the attack; or
  notifying a management entity of the source of the attack.

8. An apparatus for detecting and preventing attacks in a network, the apparatus comprising one or more processors coupled to a memory configured to:
  receive network traffic statistics of a system;
  determine a set of features of the system based on the network traffic statistics;
  input the set of features to a classification model that has been trained using historical features associated with labels indicating whether the historical features correspond to attacks;
  receive, as output from the classification model, an indication that the system is a target of an attack;
  in response to receiving the indication that the system is the target of the attack, receive additional statistics related to the system;
  analyze, the additional statistics to identify a source of the attack; and perform an action to prevent the attack based on the source of the attack, wherein determining the set of features of the system based on the network traffic statistics comprises selecting a subset of the network traffic statistics to provide as inputs to the classification model based on an input selection algorithm.

9. The apparatus of claim 8, wherein the network traffic statistics comprise simple network management protocol (SNMP) statistics.

10. The apparatus of claim 8, wherein the additional statistics comprise one or more of:
security data;
application-level statistics; or
resource utilization information.

11. The apparatus of claim 8, wherein analyzing the additional statistics to identify the source of the attack comprises one or more of:
determining whether the additional statistics indicate any alarms related to the system that indicate deviation from allowed behavior for any connections or processes of the system;
determining whether the additional statistics indicate any new connections related to the system; or
determining whether the additional statistics indicate any anomalies related to the system, wherein an anomaly comprises a deviation from an expected range for a given statistic.

12. The apparatus of claim 11, wherein analyzing the additional statistics to identify the source of the attack further comprises determining a source address of a connection for which an anomaly is determined based on the additional statistics.

13. The apparatus of claim 8, wherein the classification model comprises a random forest classifier.

14. The apparatus of claim 8, wherein performing the action to prevent the attack based on the source of the attack comprises one or more of:
applying a firewall;
removing the system from the network;
removing the source of the attack from the network;
notifying a security component of the source of the attack; or
notifying a management entity of the source of the attack.

15. A non-transitory computer-readable medium comprising instructions that, when executed by one or more processors of a computing system, cause the computing system to perform a method of detecting and preventing attacks in a network, the method comprising:
receiving network traffic statistics of a system;
determining a set of features of the system based on the network traffic statistics;
inputting the set of features to a classification model that has been trained using historical features associated with labels indicating whether the historical features correspond to attacks;
receiving, as output from the classification model, an indication of whether that the system is a target of an attack;
in response to receiving the indication that the system is the target of the attack, receiving additional statistics related to the system;
analyzing, the additional statistics to identify a source of the attack; and
performing an action to prevent the attack based on the source of the attack,
wherein determining the set of features of the system based on the network traffic statistics comprises selecting a subset of the network traffic statistics to provide as inputs to the classification model based on an input selection algorithm.

16. The non-transitory computer-readable medium of claim 15, wherein the network traffic statistics comprise simple network management protocol (SNMP) statistics.

17. The non-transitory computer-readable medium of claim 15, wherein the additional statistics comprise one or more of:
security data;
application-level statistics; or
resource utilization information.

\* \* \* \* \*